US009240186B2

(12) United States Patent  (10) Patent No.: US 9,240,186 B2
Weeks et al.  (45) Date of Patent: *Jan. 19, 2016

(54) SYSTEMS AND METHODS FOR PROVIDING AN ELECTRONIC DICTATION INTERFACE

(71) Applicant: Dolbey and Company, Inc., Cincinnati, OH (US)

(72) Inventors: Curtis A. Weeks, Loveland, OH (US); Aaron G. Weks, Cincinnati, OH (US); Stephen E. Barton, Milford, OH (US)

(73) Assignee: Dolbey and Company, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,410

(22) Filed: Dec. 9, 2014

(65) Prior Publication Data
US 2015/0106093 A1  Apr. 16, 2015

Related U.S. Application Data

(63) Continuation of application No. 14/055,072, filed on Oct. 16, 2013, now Pat. No. 8,935,166, which is a continuation of application No. 13/213,763, filed on Aug. 19, 2011, now Pat. No. 8,589,160.

(51) Int. Cl.
*G10L 21/00* (2013.01)
*G10L 25/00* (2013.01)
(Continued)

(52) U.S. Cl.
CPC ............... *G10L 15/26* (2013.01); *G06F 3/167* (2013.01); *G10L 15/28* (2013.01); *G10L 15/30* (2013.01)

(58) Field of Classification Search
CPC ...... H05K 999/99; G10L 15/22; G10L 15/16; G10L 15/20; G10L 15/10; G10L 15/08; G10L 15/12; G10L 15/063; G10L 15/87; G10L 15/187; G10L 15/142; G10L 15/144; G10L 15/14; G10L 15/30; H04M 1/271; H04M 2201/40; H04M 3/493; H04M 2203/2061; H04M 1/6505; H04M 3/533; H04M 3/36; H04M 3/537; H04M 3/5307; H04M 2201/60
USPC ............ 710/72; 704/275, 270, 235, 246, 201, 704/231, 270.1; 709/206; 715/728, 791
See application file for complete search history.

(56) References Cited

U.S. PATENT DOCUMENTS 5,812,882 A * 9/1998 Raji .................. G06F 17/30607
  379/75
6,263,375 B1 * 7/2001 Ortega ................ G06F 17/2229
  704/270

(Continued)

OTHER PUBLICATIONS

USPTO Office Action, dtd May 15, 2013.

*Primary Examiner* — Pierre-Louis Desir
*Assistant Examiner* — Anne Thomas-Homescu
(74) *Attorney, Agent, or Firm* — Dinamore & Shohl LLP (57) ABSTRACT

Some embodiments disclosed herein store a target application and a dictation application. The target application may be configured to receive input from a user. The dictation application interface may include a full overlay mode option, where in response to selection of the full overlay mode option, the dictation application interface is automatically sized and positioned over the target application interface to fully cover a text area of the target application interface to appear as if the dictation application interface is part of the target application interface. The dictation application may be further configured to receive an audio dictation from the user, convert the audio dictation into text, provide the text in the dictation application interface and in response to receiving a first user command to complete the dictation, automatically copy the text from the dictation application interface and inserting the text into the target application interface.

20 Claims, 10 Drawing Sheets

(51) Int. Cl.
*G10L 15/00* (2013.01)
*G10L 17/00* (2013.01)
*G10L 19/00* (2013.01)
*G06F 15/16* (2006.01)
*G06F 3/048* (2013.01)
*G10L 15/26* (2006.01)
*G06F 3/16* (2006.01)
*G10L 15/28* (2013.01)
*G10L 15/30* (2013.01)

(56) References Cited

U.S. PATENT DOCUMENTS

| | | | |
|---|---|---|---|
| 6,697,841 B1* | 2/2004 | Sheffield | H04L 12/58 379/67.1 |
| 6,766,297 B1* | 7/2004 | Lamer | G06F 17/30011 704/270 |
| 6,834,264 B2* | 12/2004 | Lucas | G06F 3/167 379/88.01 |
| 7,793,231 B2* | 9/2010 | Berstis | G06F 3/0481 715/791 |
| 8,132,104 B2* | 3/2012 | Ash | G06F 19/322 704/270 |
| 2002/0143533 A1* | 10/2002 | Lucas | G06F 3/167 704/235 |
| 2003/0028382 A1* | 2/2003 | Chambers | G10L 15/26 704/275 |
| 2003/0046350 A1* | 3/2003 | Chintalapati | G06Q 10/10 709/206 |
| 2006/0136220 A1 | 6/2006 | Gurram et al. | |
| 2006/0149551 A1* | 7/2006 | Ganong, III | G10L 15/22 704/270.1 |
| 2006/0253287 A1* | 11/2006 | Kammerer | 704/275 |
| 2007/0156400 A1* | 7/2007 | Wheeler | G10L 15/30 704/235 |
| 2008/0086305 A1* | 4/2008 | Lewis | G06F 17/30749 704/235 |
| 2008/0154593 A1* | 6/2008 | Da Palma | G10L 15/30 704/235 |
| 2008/0235014 A1* | 9/2008 | Oz | G06F 17/243 704/235 |
| 2009/0240668 A1* | 9/2009 | Li | G06F 17/30277 |
| 2009/0287487 A1* | 11/2009 | Rossman | G06F 19/321 704/235 |
| 2009/0319266 A1* | 12/2009 | Brown | G06F 9/4443 704/235 |
| 2011/0046950 A1* | 2/2011 | Sinvhal-Sharma | H04M 1/72597 704/235 |
| 2011/0161075 A1* | 6/2011 | Hon-Anderson | G10L 15/30 704/201 |
| 2011/0161080 A1* | 6/2011 | Ballinger | G10L 15/30 704/235 |
| 2011/0224981 A1* | 9/2011 | Miglietta | G10L 15/26 704/235 |
| 2011/0264451 A1* | 10/2011 | Hoepfinger | G10L 15/063 704/235 |
| 2012/0089392 A1* | 4/2012 | Larco | G10L 15/063 704/231 |
| 2012/0316876 A1* | 12/2012 | Jang | G06F 3/167 704/246 |

* cited by examiner

SYSTEMS AND METHODS FOR PROVIDING AN ELECTRONIC DICTATION INTERFACE

CROSS REFERENCE

This application is a continuation of U.S. patent application Ser. No. 14/055,072, filed on Oct. 16, 2013, which is a continuation of U.S. application Ser. No. 13/213,763, filed on Aug. 19, 2011, both of which are hereby incorporated by reference in their entireties.

BACKGROUND

As a background, many physicians and other professionals are required to create reports and other documents regarding their work. While these professionals may hand write or type these documents, many professionals have found that dictating the notes into a recording device is the most effective mechanism for recording their ideas. However, in many situations, conversion of the audio dictation into text can be a problem. As an example, oftentimes, the professional records an audio dictation into the recording device, which is then sent to a transcriptionist. The transcriptionist may convert the audio dictation into a transcribed report. The transcribed report may be sent back to the professional for inclusion into a professional record and/or may be sent to another electronic system for storage and/or further distribution. However, because this process utilizes actions by a plurality of different parties utilizing a plurality of different computing devices, such a process may be slow and inefficient.

SUMMARY

Included are systems and methods for providing an electronic dictation interface. Some embodiments of a system include a memory component that stores a target application and a dictation application. The target application may be configured to receive input from a user. The target application may be further configured to provide a target application interface for providing the input as text for display, where the dictation application causes the system to provide a dictation application interface for providing text for display. The dictation application interface may include a full overlay mode option, where in response to selection of the full overlay mode option, the dictation application interface is automatically sized and positioned over the target application interface to fully cover a text area of the target application interface to appear as if the dictation application interface is part of the target application interface. The dictation application may be further configured to receive audio from the user, convert the audio dictation into text, provide the text in the dictation application interface, and, in response to receiving a first user command to complete the dictation, automatically copy the text from the dictation application interface and insert the text into the target application interface.

Similarly, some embodiments of a method may be configured to actuate a target application. The target application may be further configured to receive input from a user and provide a target application interface for providing the input as text for display. The method may be further configured to actuate a dictation application. The dictation application may be configured to receive an audio dictation from the user and convert the audio dictation into text for display. The dictation application may provide a dictation application interface for providing the audio dictation as text for display, where the dictation application interface includes a full overlay mode option, a partial overlay mode option, and a windowed mode option. In response to selection of the full overlay mode option, the dictation application interface may be automatically sized and positioned over the target application interface to fully cover a text area of the target application interface to appear as if the dictation application interface is part of the target application interface. In response to selection of the partial overlay mode option, the dictation application interface may be automatically sized and positioned to cover a predetermined portion of the text area to appear as if the dictation application interface is part of the target application interface. In response to selection of the windowed mode option, the dictation application interface may be sized and positioned to appear separate from the target application interface. The method may further include receiving the audio dictation from the user, convert the audio dictation into text, and providing the text in the dictation application interface. Some embodiments of the method may be configured to automatically copy the text from the dictation application interface and inserting the text into the target application interface, in response to receiving a first user command to complete.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Embodiments disclosed herein include a system and/or method for providing an electronic dictation interface. More specifically, embodiments disclosed herein may be configured to provide an interface that allows for text from a dictation that may be inserted into a desired target application interface. In some embodiments, a professional may sign into the dictation application and activate a record option on a microphone or keyboard. In response, a dictation interface may be provided for receiving the professional's dictation. In the medical industry, the dictation application interface may include various options for inputting and/or collecting information related to the patient name, medical record, financial number, etc. The dictation application interface may take one of a plurality of modes, including a full overlay mode, a partial overlay mode, and a windowed mode.

In the full overlay mode, a dictation application interface may be overlaid onto a target application, such as word processing application interface or other text application window. The dictation application interface may be automatically sized to fill the entire text portion of the target application interface. The dictation application interface may also be configured such that movement of the target application interface will cause the dictation application interface to move as well, thus creating the impression that the dictation application interface is part of the target application interface. The dictation application interface may be configured to follow the target application interface and, if the target application interface is moved, minimized, maximized, or resized, the dictation application interface may adjust to match the target application interface. This will give the appearance that the dictation application interface is imbedded in the target application interface, when in reality it is merely positioned directly over top of the target application interface. In this mode the user is provided with the maximum amount of dictation area, while at the same time allowing for interaction with the target application interface without hindrance.

In the partial overlay mode, only a portion of the target application interface is covered by the dictation application interface. This mode may be utilized in situations where the user desires to dictate text into an existing document. Similar to the full overlay mode, in this mode, the partial dictation application interface may be configured to follow the target application interface if moved, minimized, maximized, etc.

In the windowed mode, if the dictation may be started in either the full overlay mode or the partial overlay mode, the user has the ability to switch to the windowed mode. By switching to the windowed mode, the dictation application interface will no longer be directly tied to the target application interface. This allows the user to review any text in the target application that may have been behind the overlaid dictation application interface. Once in windowed mode, the user can switch back to the one of the overlay modes to automatically reposition the dictation application interface over the target application interface.

Additionally, other options are provided such as an option regarding the type of audio to text conversion utilized for a dictation. As an example, one option may include the dictation being sent directly to a transcriptionist. A second option may include facilitating a machine conversion using a speech recognition technology (either locally or remotely) and then having the machine conversion sent to a transcriptionist for verification and error checking. A third option could be to merely have a local or remote computing device perform the full conversion using speech recognition technology, where the dictator corrects any errors, thus bypassing the need for a transcriptionist to perform verification and error checking. Other options may also be available.

Figure 1:
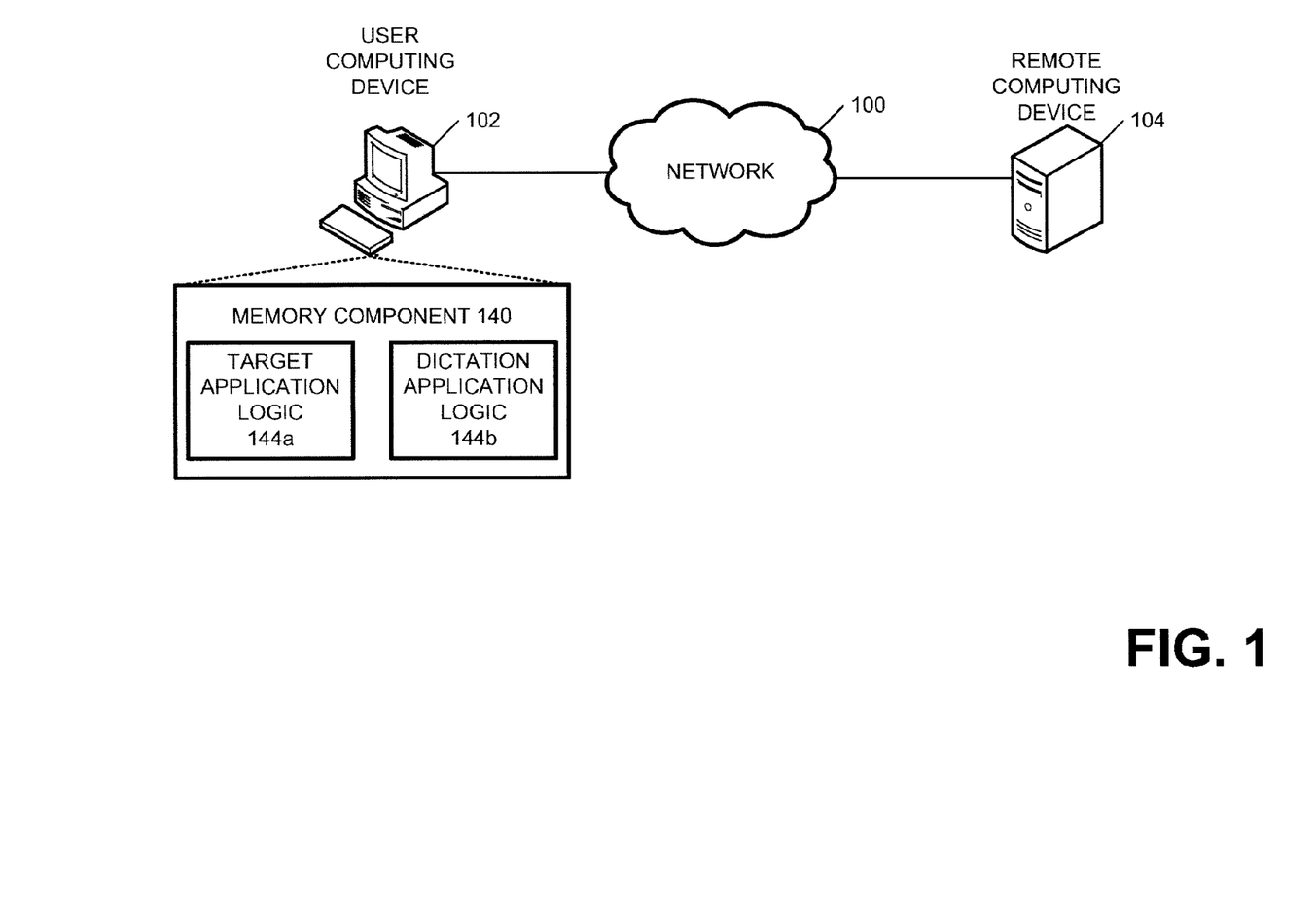
FIG. 1 depicts a computing environment for providing an electronic dictation interface, according to embodiments disclosed herein.

Referring now to the drawings, FIG. 1 depicts a computing environment for providing an electronic dictation interface, according to embodiments disclosed herein. As illustrated, a network 100 may be coupled to a user computing device 102 and a remote computing device 104. The network 100 may include a wide area network and/or a local area network and thus may be wired and/or wireless. The user computing device 102 may include any portable and/or non-portable computing devices, such as personal computers, laptop computers, tablet computers, personal digital assistants (PDAs), mobile phones, etc. As discussed in more detail below, the user computing device 102 may include a memory component 140 that stores target application logic 144a and dictation application logic 144b. The target application logic 144a may include software, hardware, and/or firmware for providing a textual functionality, such as a word processing application, notepad application, spreadsheet application, etc. Similarly, the dictation application logic 144b may include software, hardware, and/or firmware for receiving audio and providing an electronic audio to text conversion of that audio into a target application interface. Optionally, the implementation of the solution could utilize thin client computing, such that the target application and/or dictation application logic physically execute on the remote computing device and merely display and interface with the user on the user computing device 102, such as the case using CITRIX™ or WINDOWS™ Terminal Services technology. Thus, depending on embodiment, both the target and dictation application may not both reside in memory component 140. Similarly, in some embodiments, the system may be configured such that the target application and/or dictation application execute on a user computing device and the recorded audio is streamed to a remote computer to convert the dictation to text using speech recognition technology and the text sent back to the user computing device.

The remote computing device 104 may be configured as a server and/or other computing device for communicating information with the user computing device 102. In some embodiments, the remote computing device 104 may be configured to receive an audio dictation from the user computing device 102. The remote computing device 104 may convert the audio dictation into text and/or may send the converted text to a transcriptionist, as described above. Similarly, in some embodiments, the remote computing device 104 may not convert the audio dictation to text and route the audio dictation to a transcriptionist for standard transcribing. The remote computing device 104 may utilize the audio dictation and/or converted text to update voice recognition logic that may be utilized for converting future audio into text. In still some embodiments, this information may be utilized to update user specific settings, profile, and/or configurations.

It should be understood that while the user computing device 102 and the remote computing device 104 are represented in FIG. 1 each as a single component; this is merely an example. In some embodiments, there may be numerous different components that provide the described functionality. However, for illustration purposes, single components are shown in FIG. 1 and described herein.

Figure 2:
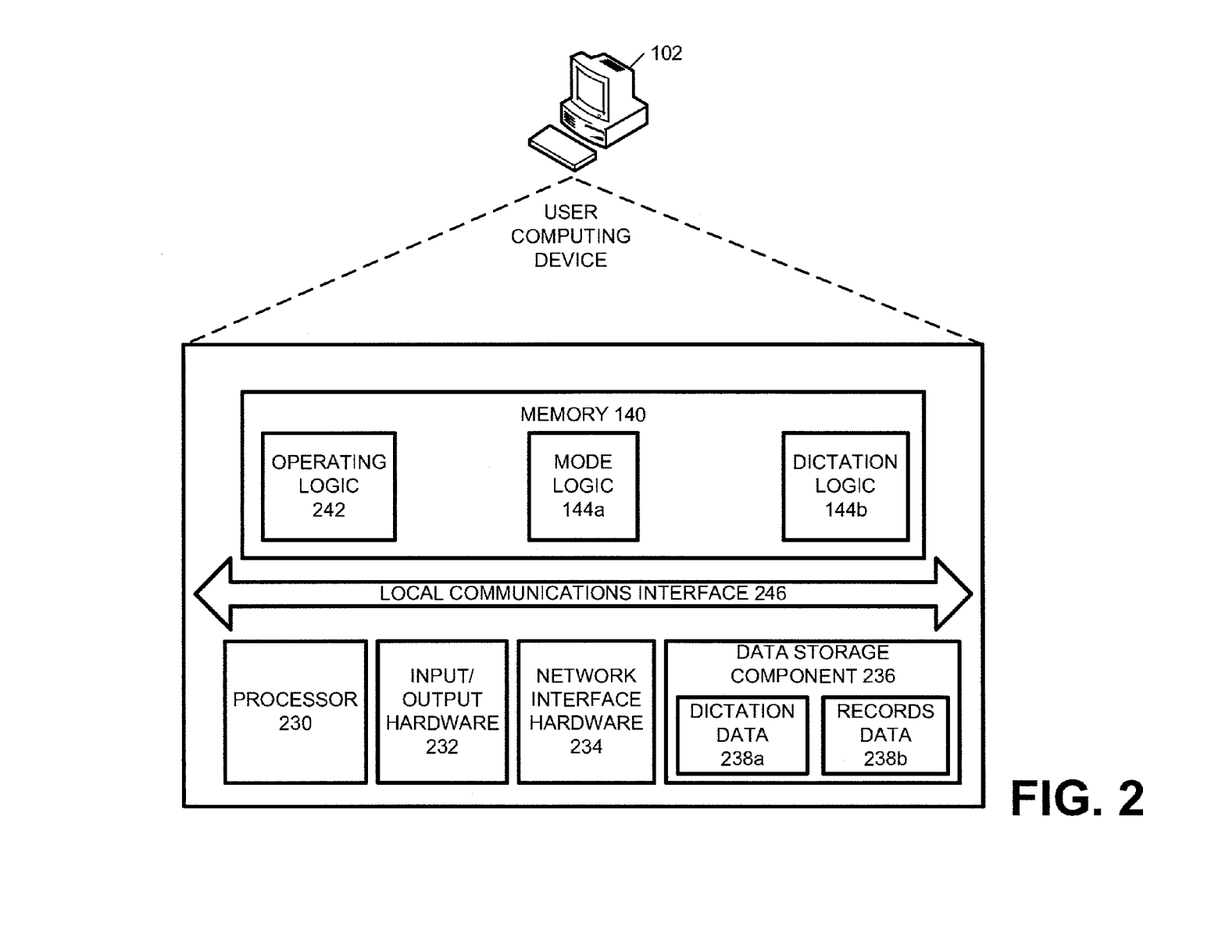
FIG. 2 depicts a computing device for providing an electronic dictation interface, according to embodiments disclosed herein.

FIG. 2 depicts a user computing device 102 for providing an electronic dictation interface, according to embodiments disclosed herein. In the illustrated embodiment, the user computing device 102 includes a processor 230, input/output hardware 232, network interface hardware 234, a data storage component 236 (which stores dictation data 238a, records data 238b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, the non-transitory computer-readable medium may reside within the user computing device 102 and/or external to the user computing device 102.

Additionally, the memory component 140 may store operating logic 242, the target application logic 144a, and the dictation application logic 144b. The target application logic 144a and the dictation application logic 144b may each include a plurality of different pieces of logic, each of which may be embodied as a computer program, firmware, and/or hardware, as an example. A local communication interface 246 is also included in FIG. 2 and may be implemented as a bus or other communication interface to facilitate communication among the components of the user computing device 102.

The processor 230 may include any processing component operable to receive and execute instructions (such as from the data storage component 236 and/or the memory component 140). The input/output hardware 232 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the user computing device 102 and other computing devices.

The operating logic 242 may include an operating system and/or other software for managing components of the user computing device 102. Similarly, as discussed above, the target application logic 144a may reside in the memory component 140 and may be configured to cause the processor 230 to provide a target application interface. Similarly, the dictation application logic 144b may be configured for providing a dictation application interface. Other functionality is also included and described in more detail, below.

It should be understood that the components illustrated in FIG. 2 are merely exemplary and are not intended to limit the scope of this disclosure. While the components in FIG. 2 are illustrated as residing within the user computing device 102, this is merely an example. In some embodiments, one or more of the components may reside external to the user computing device 102. It should also be understood that while the user computing device 102 in FIG. 2 is illustrated as a single device, this is also merely an example. In some embodiments, the target application logic 144a and/or the dictation application logic 144b may reside on different devices. Additionally, while the user computing device 102 is illustrated with the target application logic 144a and the dictation application logic 144b as separate logical components, this is also an example. In some embodiments, a single piece of logic may cause the user computing device 102 to provide the described functionality.

Figure 3:
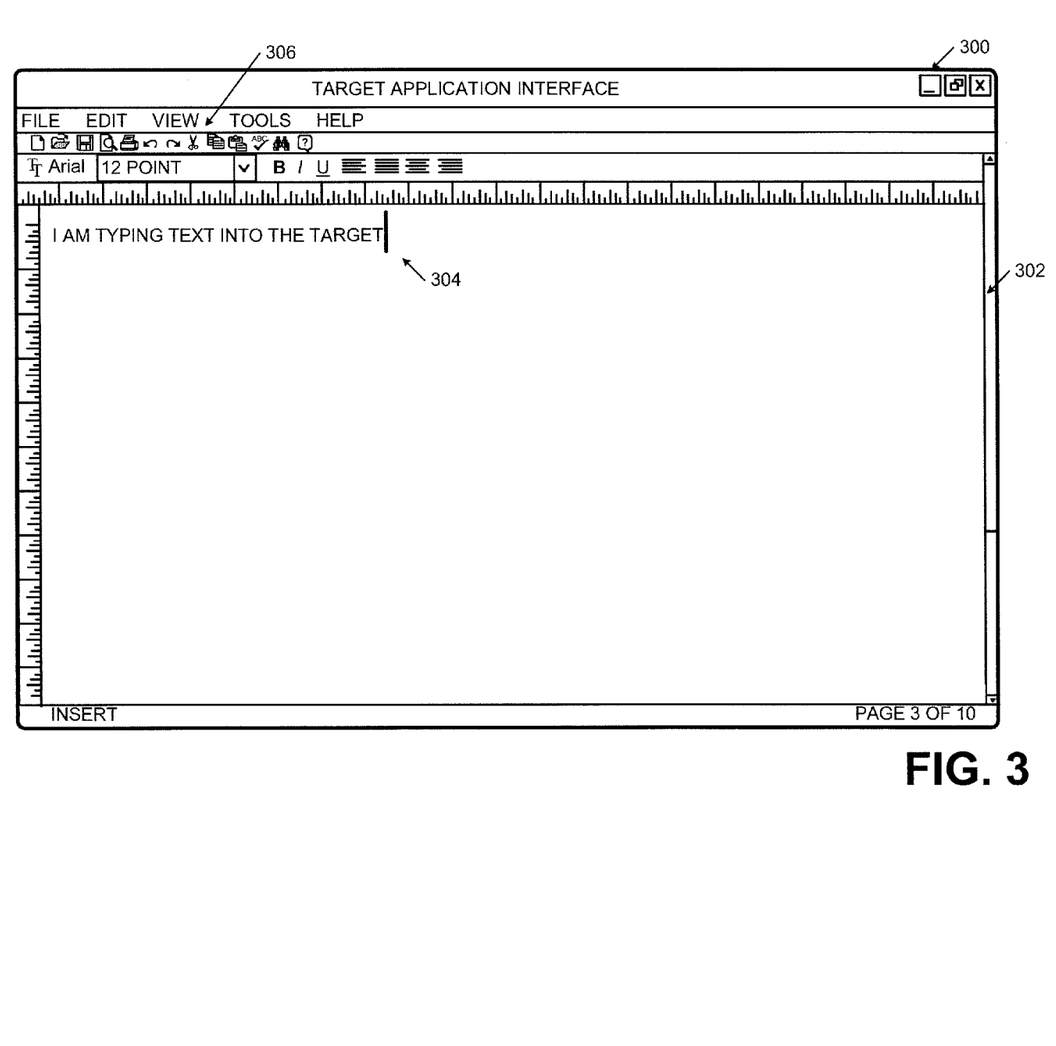
FIG. 3 depicts a target application interface of a target application, according to embodiments disclosed herein.

FIG. 3 depicts a target application interface 300 of a target application, according to embodiments disclosed herein. As illustrated, the target application interface 300 may take the form of a word processing interface. As such, the target application interface 300 may be configured to receive input from a user. The input may be a textual keystroke, a voice command and/or other input. The input may be received at a predetermined cursor position 304. Also included in the target application interface 300 is a toolbar 306, which includes options, such as formatting options to cut, copy, and/or paste text to and from the target application interface 300. FIG. 3 merely provides an example of a target application, whereas a target application may include an application window of any kind that has one or more locations for receiving text.

Figure 4:
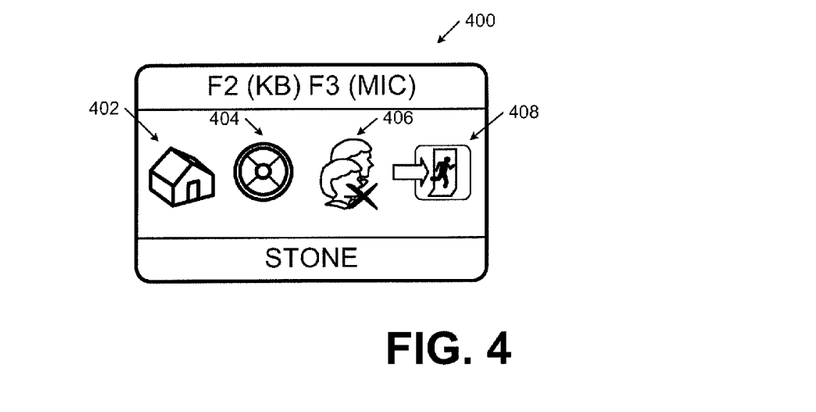
FIG. 4 depicts a wait screen interface for providing options for dictating into a target application, according to embodiments disclosed herein.

FIG. 4 depicts a wait screen interface 400 for providing options for dictating into the target application, according to embodiments disclosed herein. More specifically, the wait screen interface 400 may be provided as a part of the toolbar 306 from FIG. 3, and/or as a stand-alone widget that resides on a desktop interface of the user computing device 102 (FIG. 1). Regardless, the wait screen interface 400 may be configured to indicate a current status of the dictation application and may include a home option 402, a manual entry option 404, a change user option 406, and an exit option 408. A dictation may be initiated via a user selection of a predetermined option on a keyboard and/or microphone, which may be indicated by the wait screen interface 400. As an example, in some embodiments, the start of the dictation may be initiated via a selection of the "F2" button or via selection of the "F3" button, via selection of an option on a microphone, and/or by speaking a voice command. The current user name (e.g., Stone) may be identified in the wait screen interface 400, as well.

Regardless, by selecting the home option 402, an interface for accessing general application settings and non-dictation functions may be provided. In response to selection of the manual entry option 404, the user may be prompted for information related to the dictation. This information can include demographics, such as a medical record number, accession number, visit identifier, and encounter number, record location identifier, dictation identifier, and/or other data used to identify the record, the patient/individual associated with the record and/or the location in the record that the resultant text should be placed. Manual entry may be used when the dictation is sent to a transcriptionist for transcribing and/or editing the dictation. This information may be manually entered via the keyboard input, bar code scan, radio frequency identifier, etc. After being optionally prompted for information, the user may be presented with a professional dictation interface for a dictation application (as discussed with reference to FIG. 5).

Selection of the change user option 406 may allow the user to log off and allow another user to log in. More specifically, as the dictation application may include speech recognition capabilities, the user computing device 102 (and/or remote computing device 104) may store user specific speech characteristics and/or configuration settings. These may be stored as the dictation data 238a. Additionally, in some embodiments, the user computing device 102 may store professional records to which a particular user is assigned. As an example, if the users of the dictation application are physicians, different patient rosters may be provided, depending on which user is logged in. Additionally, selection of the exit option 408 may cause the dictation application to exit.

Figure 5:
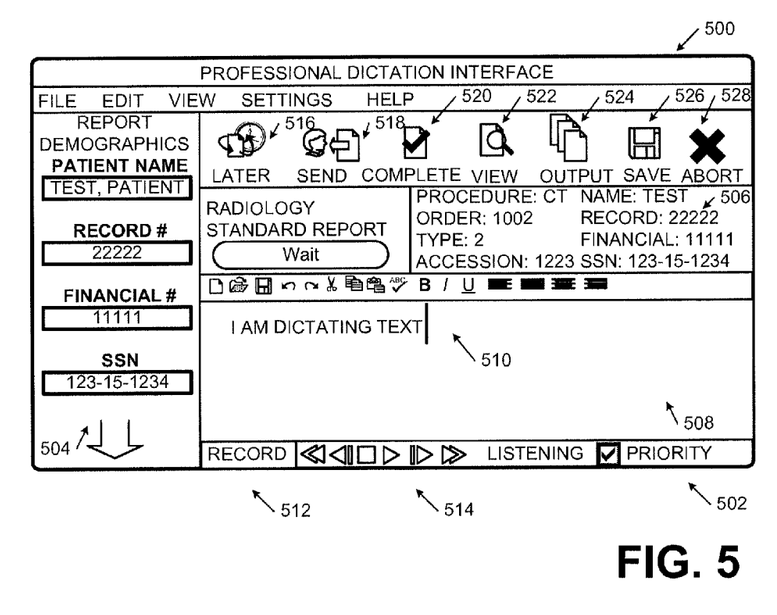
FIG. 5 depicts a professional dictation interface, according to embodiments disclosed herein.

FIG. 5 depicts a professional dictation interface 500, according to embodiments disclosed herein. As illustrated, in response to selection of the manual entry option 404 from FIG. 4, the professional dictation interface 500 (which may be configured as a medical dictation interface) may be provided. The professional dictation interface 500 may include a dictation area 502, a report area 504, and a report details area 506. The dictation area 502 may include a text area 508 and a cursor 510 for providing text from a dictation. Also included in the dictation area 502 is a record option 512 and playback options 514 for playing, rewinding, stopping, and/or pausing the recorded dictation.

The report area 504 may include various pieces of information regarding the details of a particular record. As an example, if the user is a physician, the report area 504 may provide information regarding a particular patient and/or information regarding a particular test, procedure, etc. about a particular patient. Similarly, area 506 may provide summary information regarding the particular record to which the user is dictating.

Also included in the professional dictation interface 500 is a finish later option 516, a send to MT option 518, a complete and sign option 520, a view option 522, an output option 524, a save as routine option 526, and an abort option 528. Upon selection of the record option 512, activation of a keyboard option, and/or activation of a microphone option, and/or speech recognized voice command, the user may begin dictating an audio dictation. Depending on the particular embodiment, the audio dictation may be converted to text using speech recognition technology and inserted at the cursor 510. If the user desires to pause or stop the dictation, the user may again select the record option 512. Optionally, the user may use the keyboard to insert text at the cursor position 510. Additionally, in response to selection of the finish later option 516, the current dictation may be saved for completion at a later date. In response to selecting the send to MT option 518, the current dictation may be sent to a manual transcriptionist or first to a speech recognition engine and then to a transcriptionist for editing. In response to selection of the complete and sign option 520, the current dictated text may be completed and signed by the user. In response to selection of the view option 522, the user may be provided with a view of what the final document will look like when printed. In response to selection of the output option 524, the user can adjust the distribution of the completed report such as to a printer, facsimile machine, email address, and/or other electronic transmission. In response to selection of the save as routine option 526, the dictated text may be saved as a routine. As an example, if the dictated text is a common phrase that the user often utilizes, this common phrase may be saved such that a shortcut word or phrase may be used instead. Upon speaking (and/or typing) the shortcut word or phrase, the entire saved text can be pulled into the current report. Upon selection of the abort option 528, the current dictation may be canceled.

Figure 6:
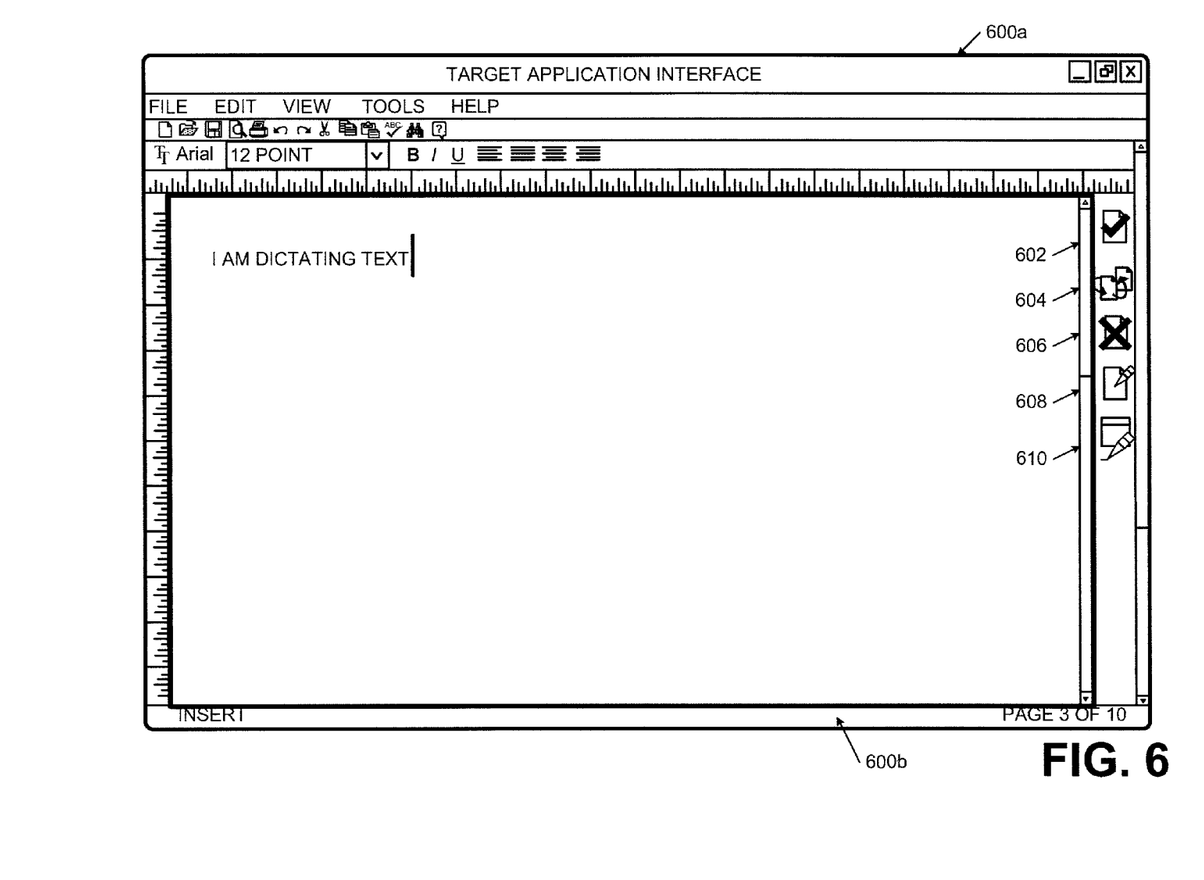
FIG. 6 depicts a dictation application interface in full overlay mode with a target application, according to embodiments disclosed herein.

FIG. 6 through FIG. 11 depict modes of the dictation application interface in conjunction with a target application. These modes of operation may be initiated using a predetermined options, a button on a microphone, and/or through a spoken command. FIG. 6 depicts a dictation application interface 600b in full overlay mode, according to embodiments disclosed herein. As illustrated the target application may provide a target application interface 600a, which may be configured as a word processing application interface and/or other interface for providing a text area. More specifically, the dictation application interface 600b may be sized and positioned to fully cover the text area of the target application interface 600a. Upon selection of the keyboard option, the microphone option, and/or a voice command (discussed above), the user may dictate an audio dictation for insertion into the dictation application interface 600b that is converted to text using speech recognition technology. Additionally, in some embodiments, the user may manually type or correct text within the dictation application interface 600b. Also included in the dictation application interface 600b are a complete dictation option 602, a mode change option 604, a delete dictation option 606, a show formatting option 608, and a save as routine option 610.

In response to selection of the complete dictation option 602, the converted text in the dictation application interface 600b may be inserted into the target application interface 600a. In some embodiments, the dictation application interface 600b may close; however, this is not a requirement. In response to selection of the mode change option 604, the dictation application may change from the full overlay mode to a partial overlay or a window mode. In response to selection of the delete dictation option 606, the text in the dictation application interface 600b may be deleted. In response to selection of the show formatting option 608, formatting options such as bold, italic, underline, etc. may be provided in the dictation application interface 600b for allowing the user to further format the text. In response the save as routine option 610, the text may be saved as a routine, as discussed above.

It should be understood that various customization options may be provided in the dictation application interface 600b. As an example, while the dictation application logic 144b may be configured to automatically determine the size and position for a dictation application interface, in some embodiments, this setting may be configured by a user. Other options include a verify option to verify if the target application interface is a viable window in which to integrate with the dictation application interface. A select text option may be provided to determine whether all of the text in the target application interface is selected upon activating the dictation application. A get text option may be provided for determining a mechanism for transferring the selected text from the target application interface to the dictation application interface. A set text option may be provided for determining a mechanism for transferring text from the dictation application interface to the target application interface. As an example, the text may be cut and pasted, copied and pasted, etc. A default display mode option may be provided for determining whether the dictation application opens in full overlay mode, partial overlay mode, or windowed mode. A dimensions options may allow the user to determine maximum and minimum heights and widths for the interfaces in the various display modes. A conversion option may be provided for allowing the user to select whether the dictations are converted locally, remotely, by a machine, by a transcriptionist, and/or by a machine with reviewing and/or error correction by a transcriptionist. An offsets option may also be included for allowing the user to manually determine the size and position for the dictation application interface, as discussed in more detail with regard to FIG. 9.

Figure 7:
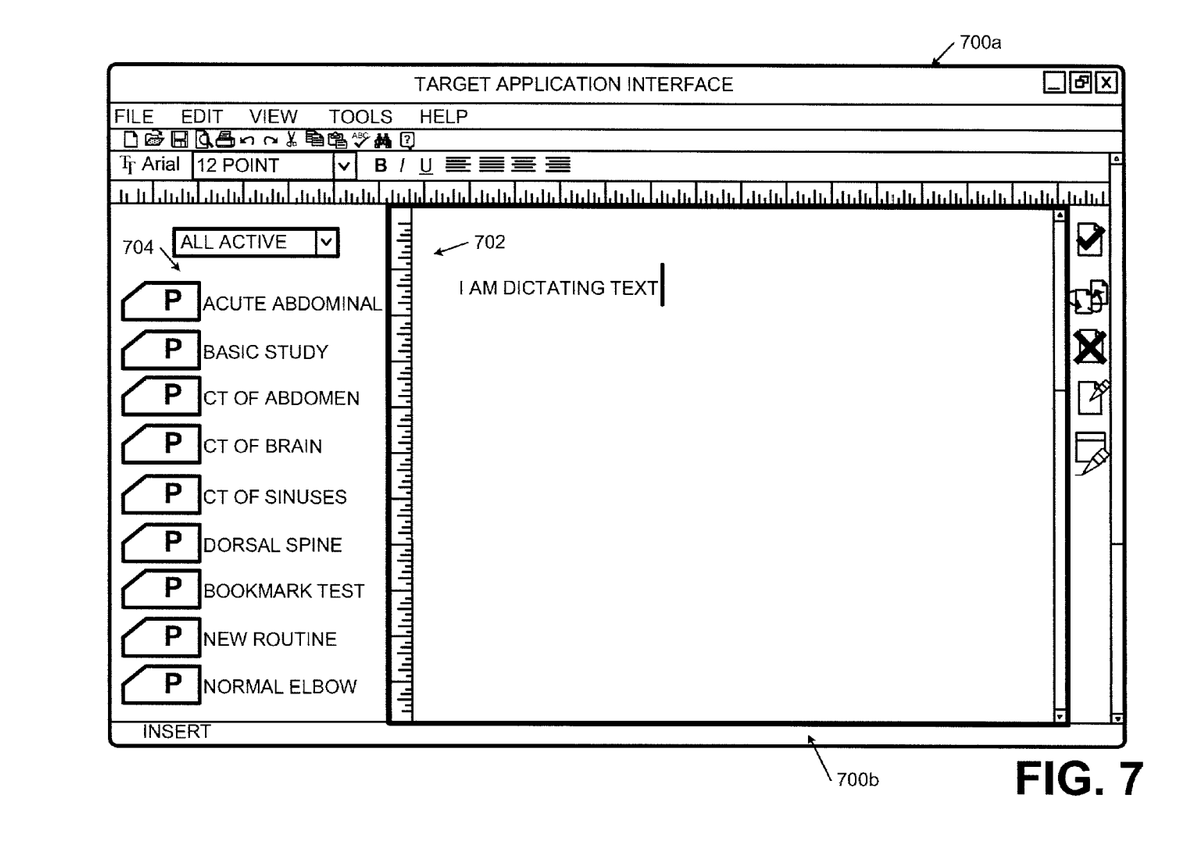
FIG. 7 depicts a dictation application interface with a routine sidebar overlaying a target application, according to embodiments disclosed herein.

FIG. 7 depicts a dictation application interface 700b with a routine sidebar 702, according to embodiments disclosed herein. As illustrated, a target application interface 700a is utilized with the dictation application interface 700b in full overlay mode. Also included is the routine sidebar 702. The routine sidebar 702 includes a plurality of previously created routines that may be selected for inserting into a dictation. As an example, if the user has previously dictated (or typed) a passage regarding an acute abdominal condition, the user may select an acute abdominal option 704 in the routine sidebar 702. Upon receiving this selection, the dictation application interface 700b may insert that passage into the dictation. Similarly, if the user states the phrase "routine acute abdominal" and/or other phrase, the dictation application interface 700b can insert the passage.

Figure 8:
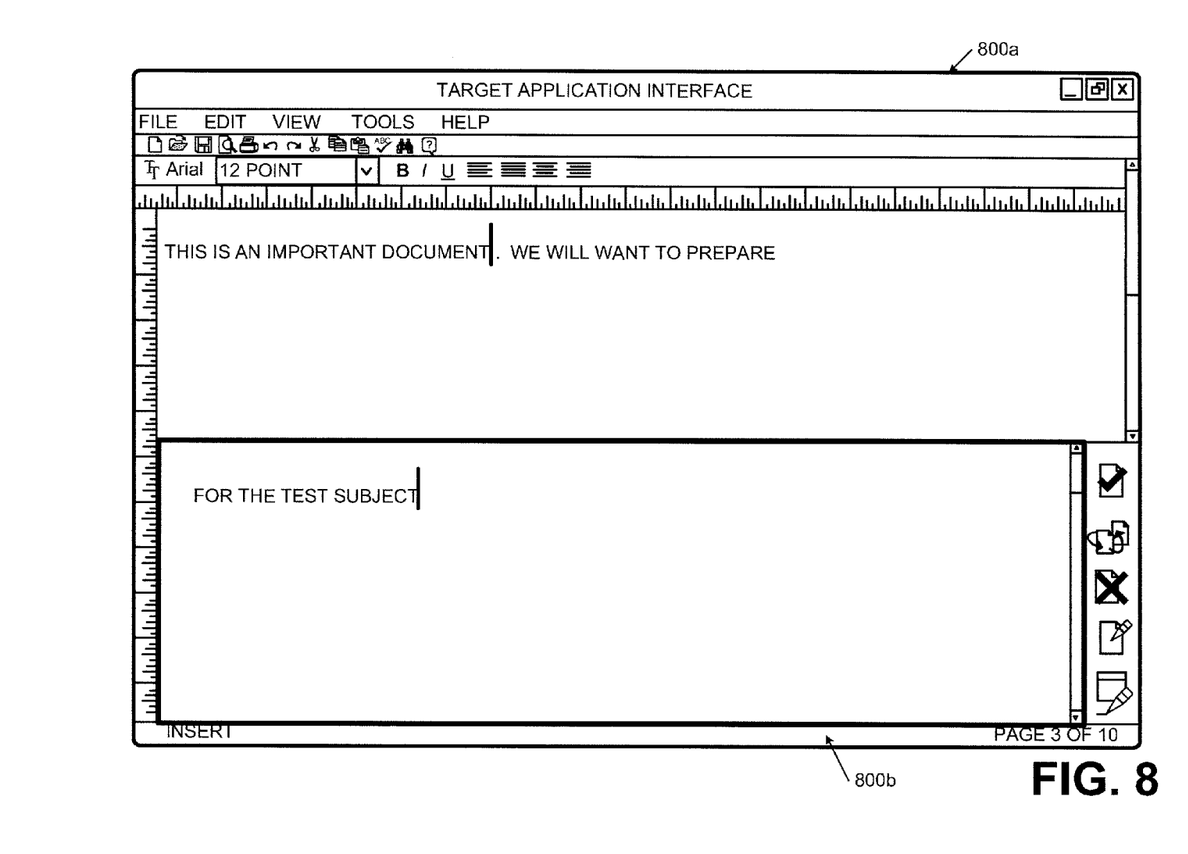
FIG. 8 depicts a partial overlay dictation application interface with a target application, according to embodiments disclosed herein.

FIG. 8 depicts a partial overlay dictation application interface 800b, according to embodiments disclosed herein. As illustrated, in response to selection of the view option 522 (FIG. 5), a partial overlay dictation application interface 800b may be provided. The partial overlay dictation application interface 800b may be configured to provide a view of the current document in the target application interface 800a. More specifically, the partial overlay dictation application interface 800 may receive an audio dictation from a user that is converted to text using speech recognition technology. Because the user can see the current document in the target application interface 800a, the user can dictate the new text and select the complete option 802 to insert the text into the target application interface 600a at a position of the cursor.

It should be understood that in the examples of FIGS. 6 and 7, the dictation application interfaces are either situated in a full overlay mode or a partial overlay mode. Regardless, the dictation application interfaces are sized and positioned at predetermined spots to appear as if they are part of the target application interfaces. As such, if the target application interfaces are moved, the dictation application interfaces will be similarly moved. Additionally, the user may choose to move the partial overlay dictation application interface 800b to a different location on the screen relative to the target application interface 800a. As such, if the target application interfaces are moved, the dictation application interfaces may continue to be moved similar to each other.

Figure 9:
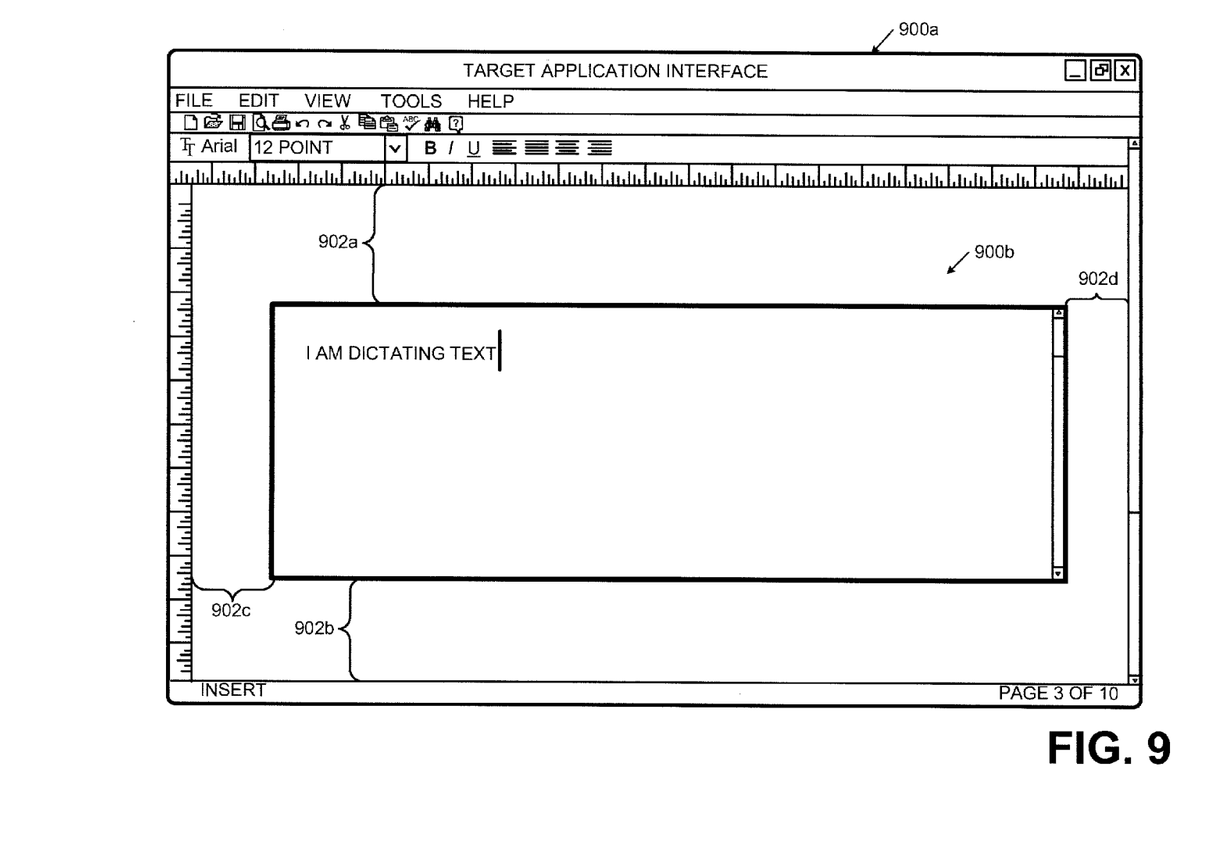
FIG. 9 depicts a dictation application interface in partial overlay mode with a target application, according to embodiments disclosed herein.

FIG. 9 depicts a dictation application interface 900b, according to embodiments disclosed herein. As illustrated, overlay offsets may be included as control settings of where the dictation application interface 900 is positioned within the target application interface 900a. The offsets may include a top offset 902a, a bottom offset 902b, a left offset 902c, and a right offset 902d. While the offsets 902 may default to predetermined areas around the target application interface 900a, in some embodiments, there may be user options to customize the offsets. As an example, the user may desire the offsets 902 to change, based on the particular target application being utilized. Additionally, if the default offsets 902 do not suit the user, the user may have the option to change the offsets 902.

Figure 10:
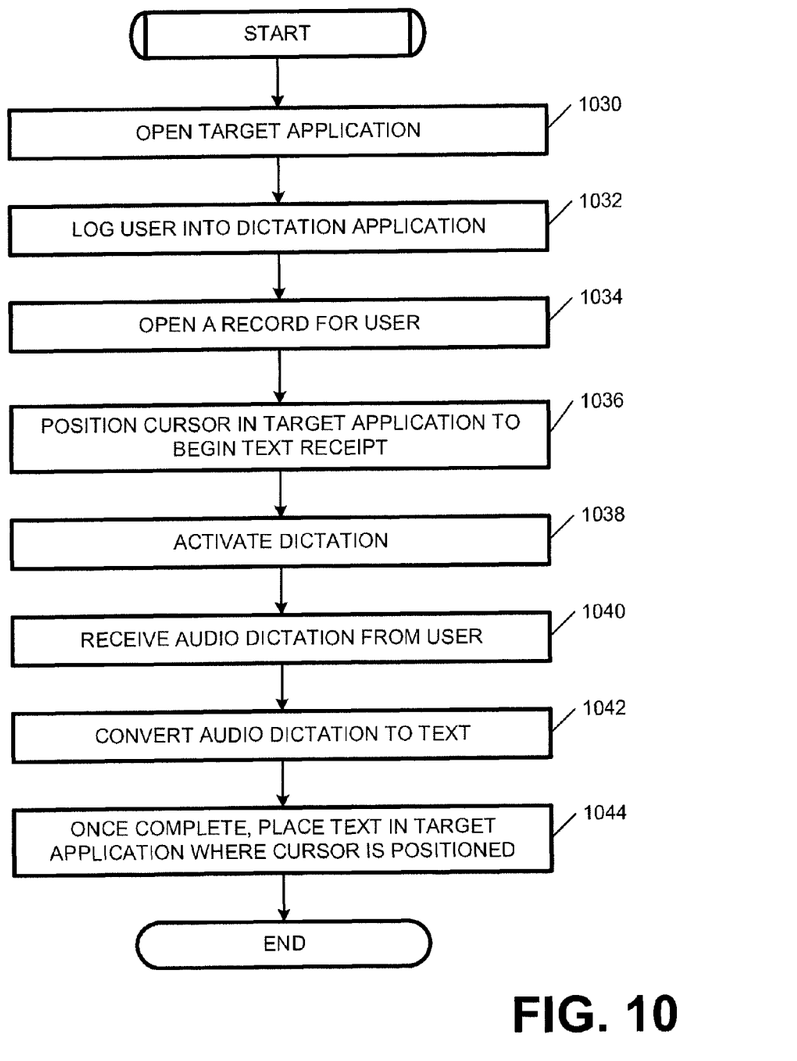
FIG. 10 depicts a flowchart for inserting text from a dictation into a target application, according to embodiments disclosed herein.

FIG. 10 depicts a flowchart for inserting text from a dictation into a target application, according to embodiments disclosed herein. As illustrated in block 1030, a target application may be opened. In block 1032, the user may be logged into a dictation application. In block 1034, a patient/client record may be opened for the user. In block 1036, the cursor of the target may be positioned to begin text receipt. In block 1038, the dictation may be activated. In block 1040, an audio dictation may be received from the user and converted to text using speech recognition technology. In block 1042, the audio dictation is converted into text, such as via a speech recognition technology. Additionally, the user may retrieve previously saved text or a template instead. In block 1044, once the dictation is complete, dictation may be converted to text, which may be inserted into the target application where the cursor is positioned.

Figure 11:
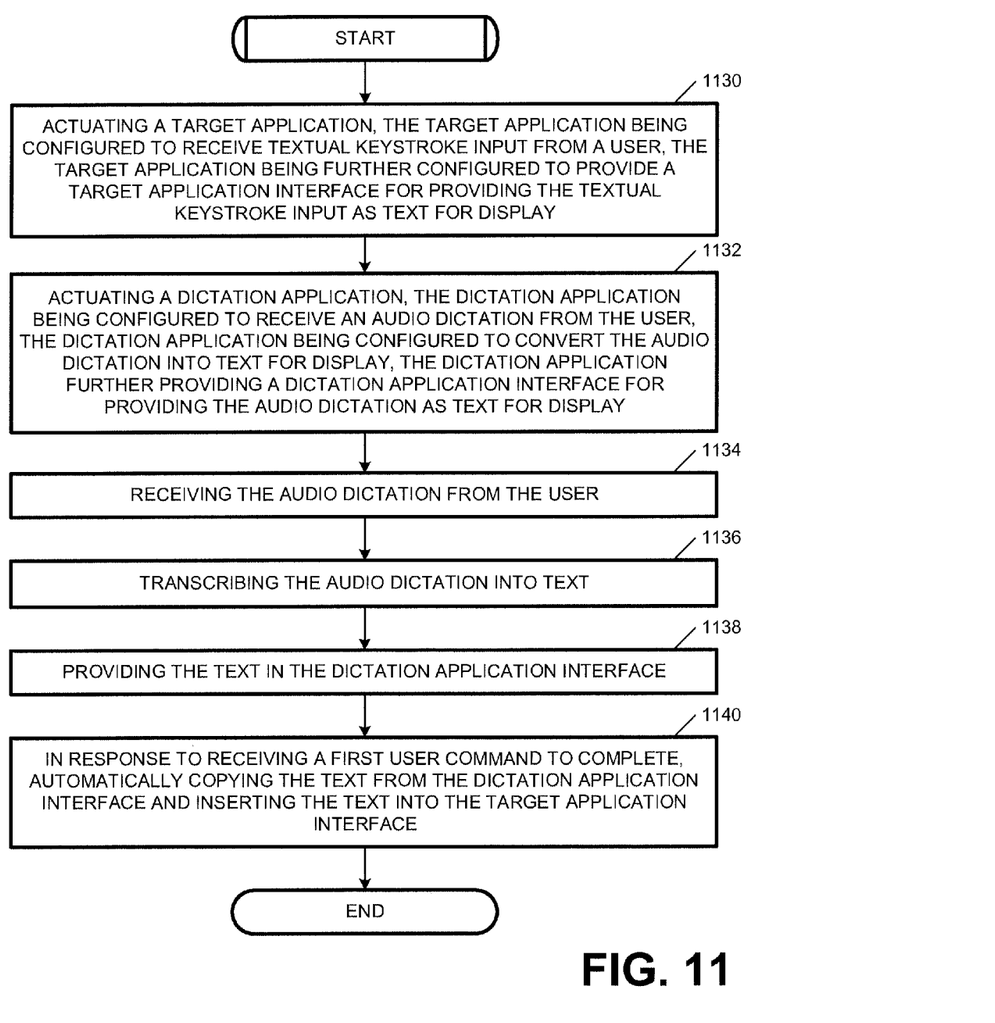
FIG. 11 depicts another flowchart for inserting text from a dictation into a target application, according to embodiments disclosed herein.

FIG. 11 depicts another flowchart for inserting text from the dictation application interface into a target application, according to embodiments disclosed herein. As illustrated in block 1130, a target application may be actuated. The target application may be configured to receive input from a user. Depending on the particular embodiment, the input may be a textual keystroke, a voice command, and/or other input. Additionally, the target application may be further configured to provide a target application interface for providing the textual keystroke input as text for display using speech recognition technology. In block 1132, the dictation application may be actuated. The dictation application may be configured to receive an audio dictation from the user. The dictation application may be further configured to convert the audio dictation into text for display. The dictation application may also provide a dictation application interface for providing the dictation as text for display. In block 1134, the audio dictation may be received from the user. In block 1136, the audio dictation may be converted into text using speech recognition technology. In some embodiments, the user computing device 102 (and/or the remote computing device 104 both from FIG. 1) may be configured with voice recognition logic for automatically converting the audio dictation into text. Additionally, in some embodiments, the user computing device 102 and/or the remote computing device 104 may be configured to send the audio dictation to a transcriptionist for transcription. In still some embodiments, the user computing device 102 and/or the remote computing device 104 may be configured to perform a voice recognition conversion of the audio dictation and then send the converted text to the transcriptionist for editing and proofreading. Regardless, in block 1138, the text may be provided in the dictation application interface. In block 1140, in response to receiving a first user command to complete the dictation, the text may be automatically copied from the dictation application interface and inserted into the target application interface. If the dictation or converted text was sent to a transcriptionist, the text may be inserted into the target application interface by the transcriptionist or sent to the target application interface through an automated electronic transmission.

It should be understood that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all permutations and sub-permutations of all elements, features, and aspects discussed above. All such modifications and variations are intended to be included herein within the scope of this disclosure.

Therefore, at least the following is claimed:

1. A system comprising:
    a processor, and
    a memory component that stores logic, that, when executed by the processor, causes the system to perform at least the following:
        provide a dictation application interface for display on the display device, wherein the dictation application interface is positioned over the target application interface to substantially cover the text area of the target application interface to appear as if the dictation application interface is part of the target application interface and wherein the dictation application interface is adjusted to coincide with a detected adjustment to the target application interface; and in response to receiving a user command to complete a dictation automatically insert an audio dictation from the dictation application interface into the target application interface.

2. The system of claim 1, wherein the target application comprises word processing functionality.

3. The system of claim 1, wherein the target application and the dictation application reside on different devices.

4. The system of claim 1, wherein the logic further causes the system to provide a record option for recording audio for dictation.

5. The system of claim 1, further comprising a computing device for receiving audio data and converting the audio data into the audio dictation.

6. The system of claim 1, wherein the dictation application converts an audio recording into text and provides the text of the audio recording for display in the dictation application interface.

7. The system of claim 1, wherein the logic further causes the system to perform at least the following:

determine a record associated with the audio dictation; and provide a summary area including information regarding the record.

8. A system for providing a dictation interface comprising:

a processor; and a memory component coupled to the processor that stores a target application that, when executed by the processor, causes the system to provide a target application interface for display of input from a user, the memory component further storing a dictation application that, when executed by the processor, causes the system to perform at least the following:

provide a dictation application interface for displaying text, wherein the dictation application interface is automatically constructed over the target application interface to cover a predetermined portion of the target application interface to appear as if the dictation application interface is part of the target application interface, such that the dictation application interface adjusts match an adjustment to the target application interface;

receive audio data from the user;

convert the audio data into text;

provide the text in the dictation application interface; and in response to a triggering event, automatically insert the text from the dictation application interface into the target application interface.

9. The system of claim 8, wherein the target application comprises word processing functionality.

10. The system of claim 8, wherein the target application and the dictation application reside on different computing devices.

11. The system of claim 8, wherein the dictation application further causes the system to provide a record option for recording the audio data.

12. The system of claim 8, further comprising a computing device for converting the audio data into text.

13. The system of claim 8, wherein the dictation application causes the system to convert an audio recording into text and provides the text of the audio recording for display in the dictation application interface.

14. The system of claim 8, wherein the dictation application interface provides a split screen view of an existing document in the target application interface.

15. The system of claim 8, wherein the dictation application further causes the system to perform at least the following:

determine a record associated with the audio data; and provide a summary area including information regarding the record.

16. A non-transitory computer-readable medium that stores logic that, when executed by a processor, causes a computing device to perform at least the following:

provide a target application interface associated with a target application, wherein the target application interface includes a text area for receiving text;

provide a dictation application interface, associated with a dictation application, wherein the dictation application interface is positioned to cover at least a predetermined portion of the text area of the target application interface to appear as if the dictation application interface is part of the target application interface such that, upon a determination that an alteration has been implemented on the target application interface, the dictation application interface adjusts to match the alteration of the target application interface;

receive audio data;

convert the audio data into text data;

provide the text data in the dictation application interface; and in response, to receiving a user command to complete, automatically insert the text data into the target application interface.

17. The non-transitory computer-readable medium of claim 16, wherein the dictation application interface provides a split screen view of an existing document in the target application interface.

18. The non-transitory computer-readable medium of claim 16, wherein the dictation application interface further provides a report area interface that provides information regarding at least one of the following: a particular patient, a test performed on the particular patient, and a procedure performed on the particular patient.

19. The non-transitory computer-readable medium of claim 16, wherein the logic further causes the computing device to perform at least the following:

determine a record associated with the audio data; and provide a summary area including information regarding the record.

20. The non-transitory computer-readable medium of claim 16, wherein the target application comprises word processing functionality.

* * * * *

UNITED STATES PATENT AND TRADEMARK OFFICE
CERTIFICATE OF CORRECTION

| | | |
|---|---|---|
| PATENT NO. | : 9,240,186 B2 | Page 1 of 1 |
| APPLICATION NO. | : 14/564410 | |
| DATED | : January 19, 2016 | |
| INVENTOR(S) | : Curtis A. Weeks et al. | |

It is certified that error appears in the above-identified patent and that said Letters Patent is hereby corrected as shown below:

ON THE TITLE PAGE
Item (72) Inventor
Change "Aaron G. Weks" to --Aaron G. Weeks--

Signed and Sealed this
Nineteenth Day of April, 2016

Michelle K. Lee
*Director of the United States Patent and Trademark Office*